United States Patent Office 3,246,149
Patented Apr. 12, 1966

3,246,149
METHOD FOR RADIOACTIVE MAGNETIC
FLAW DETECTION
Zenon Kazenas, Euclid, and Richard A. Ward, Cleveland
Heights, Ohio, assignors, by mesne assignments, to
John D. Steele, Cleveland, Ohio
No Drawing. Original application Aug. 3, 1959, Ser.
No. 831,031, now Patent No. 3,155,622, dated Nov. 3,
1964. Divided and this application Apr. 25, 1963, Ser.
No. 275,530
9 Claims. (Cl. 250—71)

This invention relates to improvements in materials employed in magnetic flux systems of nondestructive testing and methods of producing and using such materials. This application is a division of our co-pending application for "Method and Means for Radioactive Magnetic Flaw Detection," Serial No. 831,031, filed August 3, 1959, now U.S. Patent No. 3,155,622. This application is directed to methods of using radioactive magnetic inspection compositions. Specific reference is also hereby made to the co-pending application of Zenon Kazenas, Serial No. 605,192, filed August 1, 1956, now U.S. Patent No. 2,936,287, granted May 10, 1960.

Magnetic flux systems of nondestructive testing are, and have been for many years past, among the most widely and successfully used testing methods for locating flaws in parts and structures of ferromagnetic materials, hereinafter sometimes referred to as "test bodies." Examples of such flaws are voids and discontinuities with or without surface openings, such as cracks, blow holes, forging laps, laminations, deep scratches, as well as occlusions of solid material which is nonmagnetic or substantially less paramagnetic than the test body, such as slag stringers. In general such magnetic flux systems of nondestructive testing comprise the steps of creating a magnetic flux within, or passing a magnetic flux through, the test body. A flaw in the test body will concentrate the magnetic flux in the area of the flaw and cause a powder of magnetic particles to adhere to the surface of the test body at the point or line of the flaw; the particles, so adhered, thereby reveal the existence and location of the flaw and will frequently give an indication of the size and nature of the flaw, as well. These magnetic flux systems are widely used in the aircraft industry and other fields.

Extensive efforts have been made over the years to improve the methods and testing materials as to sensitivity, effectiveness, ease, and efficiency of operation. The original magnetic flux systems employed magnetic particles that were either dull, brownish red or black in color and the particles attracted to the flaw were looked for visually under ordinary light. The visibility of the flaw indications under these circumstances left much to be desired because of the frequent poor contrast between the particles and the metal background. Indeed, under visible light many indications were missed if the flaws were fine or minute and their indications correspondingly small.

A substantial improvement with respect to visibility was made in U.S. Patent No. 2,267,999 granted to R. C. Switzer for "Magnetic Testing." Essentially the improvements comprised the use of a magnetic flux as described above, but with testing powders whose particles are both fluorescent and magnetic. The test body is then inspected in the substantial absence of visible light but under invisible fluorescigenous radiation, such as filtered ultraviolet light (black light). A small amount of visible violet light passing through the filter and reflecting from the test body gave the test body a dark blue or purple cast. The black light, however, caused the fluorescent magnetic particles adhering to the test body at the location of the flaws to emit visible light. The vastly increased contrast ratios between the fluorescent magnetic particles emitting visible light and the dark background of the test body greatly expedited the discovery of many flaw indications, especially in difficultly inspected locations as the inside surface of coil springs or the interior of tubes that might otherwise pass without detection.

In actual practice both the nonfluorescent and the fluorescent systems of magnetic flux location require constant visual searching of the test bodies in order to locate the flaw indications. The necessity of inspecting visually every test body in a production lot consisting of hundreds or thousands of pieces has necessitated in many cases the use of a large number of operators. Furthermore, the monotonous and tedious searching of every piece for flaws can tire and render an operator inattentive, causing the operator to overlook critical flaw indications on the test bodies under the psychologically fatiguing condition of repetitively examining substantially identical parts or pieces.

To eliminate the chance for human error, it has been proposed to supplement or replace visual inspection of the test bodies with visible light responsive means, as with photoelectric cells which would respond to the visible light emitted by the flaw indication in the fluorescent systems. To date, no such systems which would supplement or replace human visual inspection have proved sufficiently reliable, despite the obviously long-felt need for them. It is, therefore, an object of this invention to provide a magnetic flux system of nondestructive testing which removes a large part of the chances of human failures in the detection of flaws.

Another object of this invention is to provide radioactive paramagnetic particles and slurries having carefully controlled characteristics of radioactive emission, half life, specific activity, uniformity, particle size distribution and ease and safety of handling.

Another object of this invention is to provide an automatic means of scanning the test bodies to register the presence and locations of flaws and to cause flawed pieces to be rejected completely or withheld for further inspection.

Another object of this invention is to provide in addition to radioactive particles of the nonfluorescent type, radioactive paramagnetic particles which are strongly fluorescent so that after automatic rejection of flawed test bodies carrying such particles the flawed bodies may be visually inspected under ultraviolet radiation to determine the nature and location of such flaws.

It is a further object of this invention to provide paramagnetic particles having ion exchange characteristics, which particles may be stored indefinitely in a nonradioactive condition yet may quickly be made radioactive by contacting with a solution containing any suitable radioactive isotope in ionized or ionizable form far from the site, if desired, of the original production of the radioisotopes.

It is a further object of this invention to provide fluorescent and nonfluorescent radioactive paramagnetic particles which are capable of being treated to remove partially or completely the radioactive component.

Other objects and advantages of this invention will be apparent from the following general and detailed specification and appended claims.

We have recognized that, instead of, or conjointly with, the fluorescent indication secured by the fluorescent system of nondestructive testing, one might incorporate a radioactive material, either to activate the fluorescent component of the fluorescent paramagnetic testing powders or to serve as the indicating element of the powders. However, in any method of simply adding a radioactive material to the mixture of paramagnetic cores and adhesive materials to produce a fine paramagnetic powder comprising a paramagnetic element, an indicating element, and an adhesive material joining the two, such a method necessitates working with "hot" materials which are not only dangerous to the workmen preparing the powders but may dangerously contaminate the production machinery required in the production of the powders. Therefore, wholly apart from the danger to human life involved, the production of radioactive paramagnetic testing powders has not been economically feasible because of the cost of the production equipment which would be then contaminated or endangered.

Basically the paramagnetic particles to be described herein are made by adhering to the magnetic cores a material that will readily adsorb, absorb or react with a radioactive component, the adhesion taking place preferably through the intermediate agency of an adhesive resin having the property of hardening in stages which allows the processing of the composite material into powders or slurries having the desired composition and particle size characteristics.

Among the magnetic cores that may be used are the magnetic iron oxides, both red and black, metallic iron prepared by the carbonyl process, aluminum, and any other material that is paramagnetic, such as other paramagnetic metals, alloys, oxides, and salts. (See "Smithsonian Physical Tables," Fowle, 1927, Seventh Edition.) It must be borne in mind that, in general, the higher the magnetic susceptibility the better the material is as a magnetic core.

Adhesion of the adsorptive substratum (and in some cases the fluorescent material) to the magnetic core substance may be achieved by the lacquer method of the Switzer Patent No. 2,267,999 or by the method of the Kazenas Patent No. 2,936,287. The latter method employing epoxy type adhesive resins is the most satisfactory, although the use of other crosslinking and thermosetting resins such as phenol formaldehydes, urea formaldehydes, melamine formaldehydes, polyurethanes, polyesters and the like is quite feasible.

After the magnetic component, an adhesive or combining material, and a reactive or absorptive material have been combined and reduced to the desired particle sizes (with or without fluorescent materials combined therewith), the particles are dispersed in a bath or medium in which radioactive materials are also dispersed. Said spent radioactive materials then become bonded to the powders by absorption, adsorption or chemical reaction.

Thus, it will be noted that the phenomenon by which the radioactive materials become incorporated is essentially a surface treatment of the individual particles in the testing powders. Such incorporation will not contaminate the machinery for producing the powder nor is it necessary that the radioactive components be incorporated at the same place and time where and when the powders are formed. Instead, the powders, as such, may be produced and stored as a nonradioactive product and altered to their radioactive condition just before use. Further, because these powders are essentially surface treated, after use both the powders themselves and the bodies tested therewith may be subjected to de-contaminating treatments, a step not heretofore feasible with previously proposed radioactive magnetic powders which were likely to have the radioactive component encased by an impervious resin resistant to a treatment which might otherwise attack and de-contaminate the radioactive component.

Whereas the prior art magnetic testing powders, if treated at all to enhance their normal color in visible light, comprised a paramagnetic element, an adhesive resin, and visible light-emitting tracer material, paramagnetic powder products made according to this invention essentially comprise a paramagnetic element, an adhesive resin, an absorptive, adsorptive or reactive material (hereinafter referred to as a "carrier") adhered to the paramagnetic element, and a radioactive substance carried in and on the surface of the powder by the carrier. As indicated above, the organization of the powder according to this invention does not exclude the incorporation of a visible-light emitting fluorescent material and/or coloring materials supplementing the carrier and radioactive material.

The carrier material may, as indicated, be a purely absorptive or adsorptive material which mechanically carries the radioactive material. Such absorptive or adsorptive carrier material may be, for example, silica gel, diatomaceous earth, activated clays, and like substances which may be reduced to pigmentary particle size and still retain their absorptive or adsorptive properties. Such products may be perfectly satisfactory, particularly when the radioactive material has a relatively short half-life and no problems are encountered in working with a solution or liquid dispersion of radioactive material of sufficient concentration to insure that all or substantially all particles will exhibit adequate radioactivity after treatment and the half-life is sufficiently short to avoid serious disposal or decontamination problems, either of the spent magnetic powders or in subsequent handling of test bodies to which the particles may cling or in which the particles may be entrapped after testing.

In general, however, we have found it preferable to incorporate the radioactive material in the testing powders by a chemical reaction between the radioactive material and the carrier material combined with the paramagnetic cores. The chemical reaction involved may follow any one of the standard types of chemical reaction: simple addition $(A+B=AB)$, substitution $(AC+B=AB+C)$, and double decomposition and synthesis $$(AC+BD=AB+CD)$$

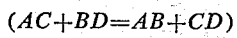

Of these three types of reaction, the double decomposition type of reaction is usually more satisfactory by permitting the use of ion exchange or chelating materials. Such materials are characterized by an ability to extract exceedingly minute and dilute proportions of the radioactive material from the liquid solutions or dispersions, in which the radioactive material may be carried prior to incorporation in the testing powders made according to this invention. Further, especially when using ion exchange materials, the reaction may often be reversed. This aids in decontaminating tested bodies or articles and extracting the radioactive component from the spent radioactive powders so that the radioactive component is separated in a form permitting convenient disposal.

Either during or after adhering carrier material to the magnetic cores, the massive aggregate is broken up or ground into fine discrete particles of the average size desired. Grinding in water is satisfactory in most cases. The slurry that forms may be levigated or subjected to a settling process or a magnetic separation to remove any nonmagnetic material that breaks off during the grinding operation; for example, to remove a certain amount of brittle ion exchange material. Usually if the grinding is thorough, very little additional material will break off during subsequent use. Processing in water has an advantage that the ion-exchange resin or other adsorptive or chelating carrier material is properly wet through or swelled and is in a better condition to take on the radioactive substance.

Some of the compositions containing ion-exchange resins are treated chemically after the combining and grinding steps are complete to convert them to the proper chemical form. Thus the polyacrylic acid type of ion-exchange resin is generally converted from its acid or carboxy form into a salt, such as the sodium salt, by treating the powders containing the resin with sodium hydroxide or some other alkali. This conversion is carried out, either batchwise or in a column, by contacting the powders with an aqueous alkali solution and then washing the treated powders well with water.

The choice of ion-exchange resin or other adsorptive or reactive carrier material depends in some cases upon the radioactive substance. With radioactive reagents of high specific activity an adsorptive or reactive substratum of only relatively low capacity is required. In that case almost any substratum will suffice that will not allow the radioactive material to be leached out when in contact with the aqueous or nonaqueous suspending medium. With radioactive reagents of low specific activity on the other hand, a substratum of high capacity is required. For example, if the radioactive preparation is a cobalt chloride prepared by dissolving neutron-irradiated metallic cobalt in which only one cobalt atom in 100,000 is converted from $Co^{59}$ to $Co^{60}$, an exchange capacity is required in the ion-exchange resin of at least 2 milliequivalents per gram of dry resin if only a single batchwise contact with the cobalt chloride solution is to be made.

Commercial ion-exchange resins, if they have been converted to the proper chemical forms, usually have ample ion-exchange capacity for the adsorption of practical amounts of radioactive ions. For example, the sulfonated cross-linked polystyrene type of resin in the sodium form is suitable for virtually all of the positive radioactive ions. This resin will take up practically any trivalent ion from a dilute solution to the extent of 90% to 100%. Divalent ions and the larger monovalent ions are taken up the extent of 30% to 60% in one batchwise contact followed by a water wash. Since the above resin is the least expensive and perhaps the most versatile of the ion-exchange agents, it is the preferred substratum in many cases.

The cross-linked acrylic acid type of resin, for example, in its sodium form is another resin of outstanding value. It has the advantage of being sufficiently tough and flexible to show practically no breakdown during a long grinding operation to reduce the combined paramagnetic material and resin to powder particles. Freqeuntly no separation, or settling step is required. In this condition, the resin's affinity for cobalt ions, for example, is so strong that radioactive cobalt ions are taken up to the extent of substantially 100% in a single batchwise contact with a cobalt 60 chloride solution.

Many other ion-exchange resins are useful in particular instances. Thus cesium 137 ions are strongly taken up by sulfonated phenol formaldehyde resins made by reacting formaldehyde with phenol meta sulfonic acid. Another resin of the formaldehyde type which is suitable for cobalt 60 is made by condensing formaldehyde with 5 resorcyclic acid.

Negative radioactive ions, such as sulfate ions derived from sulfur 35, are removed from solution by certain quaternary ammonium derivatives of cross-linked polystyrene. The use of this type of resin and of the weakly basic ion-exchange resins extends the range of the radioactive paramagnetic particles to include many nonmetallic radionuclides and metallic radionuclides in their higher valance forms. Thus tantalum 182 is retained by the basic resins as a tantalate ion, $Ta_2O_6$ or $Ta_6O_{19}$. Other radioactive materials providing negative ions are iodine 131 in the iodide form, sulfur 35 in the sulfide and sulfate forms, and phosphorous 32 in the phosphate form, for example.

Ion-exchange resins for use in this invention may also have metal chelating properties. The polyacrylic acid type of resin already described probably owes much of its activity to the attraction of each polyvalent metal ion to separate but adjacent carboxyl groups to form non-planar metal-containing rings. A deliberate insertion of metal-chelating groups is also possible. For example, the co-polymer of styrene and divinyl benzene may be given metal-chelating properties by reacting first with monochloromethyl ether and then with a salt of imino diacetic acid. The tridentate chelating groups so formed confer the property of sequestering metal ions. Many ion exchange resins having unique properties or low cost and which are suitable for use in the products and processes of this invention may be made from the host of resin intermediates available at the present time or in the future.

Ion-exchange substances other than ion-exchange resins can be used as the adsorbing substrata. Natural zeolites, synthetic zeolites and certain clays have ion exchange characteristics and could be used with at least some of the radioactive isotopes, particularly with the trivalent radioactive ions. Semi-resinous or nonresinous ion-exchange substances which may be employed as the ionic substrata are sulfonated coal, polyphosphates, porphyrins, unmetallized phthalocyanines and other nonresinous chelating crystalloids to name only a few.

Finally there are many highly absorptive and adsorptive substrata that have little or no ion exchange qualities that can still be used to take up and hold radioactive substances in a solid condition. It would be necessary to choose only those substrata to which radioactive elements or compounds could be affixed for a practical period of time without undue loss or dissolution of the radioactive substance from the substratum. Thus special deyhdrated gels, molecular sieves, molecular matrix silica gels and certain activated carbons are within the broad class of absorptive materials which may be employed.

The usefulness of a radioactive species for this invention is determined first of all by its half-life. Radionuclides having half lives of a million years or more are usually of little value because the specific activity or the number of millicuries per gram of the nuclide is too low. At the other extreme radionuclides with half lives of less than one day are seldom of use unless they are the result of the continuous disintegration of a parent radionuclide of half-life longer than one day. In the latter case the parent radionuclide shall for the purposes of this invention be considered to be the source of all the radiations of the radionuclides resulting from it. With this relationship in mind all examples of this invention have been drawn up in terms of the parent radionuclides only. Thus the mixture of the cholorides of cerium 144 and praseodymium 144 is considered to be simply cerium 144 chloride. Although most of the powerful radiations of the mixture come from the break up of praseodymium 144, that isotope if separated from the cerium 144 would be useful for only one hour or so because of its short half life of 17.5 minutes.

The following list of radioisotopes which may be used is set down for the purposes of illustration only:

| Isotope | Half-life | Isotope | Half-life |
|---|---|---|---|
| La 140 | 40 hours. | W 185 | 73 days. |
| Yt 90 | 2.54 days. | Ir 192 | 74 days. |
| Au 198 | 2.7 days. | Sc 46 | 85 days. |
| Sb 122 | 2.8 days. | S 35 | 87 days. |
| Au 199 | 3.15 days. | Ta 182 | 115 days. |
| Bi 210 (Ra E) | 5.02 days. | Ca 45 | 163 days. |
| Ba 131 | 11.5 days. | Ag 110 m | 270 days. |
| Ba 140 | 12.8 days. | Ce 144 | 282 days. |
| Rb 86 | 19.5 days. | Cs 134 | 2.3 years. |
| Cr 51 | 27.8 days. | Pm 147 | 2.6 years. |
| Mixed fission products | | Tl 204 | 4 years. |
| Fe 59 | 45 days. | Co 60 | 5.3 years. |
| Hf 181 | 45 days. | Eu 152, 154 | 13 years. |
| Sr 89 | 53 days. | Sr 90 | 25 years. |
| Sb 124 | 60 days. | Cs 137 | 30 years. |
| | | C 14 | 5,568 years. |

Radionuclides of various half-lives may be divided arbitrarily into three groups according to half-life:

(1) Long half-life isotopes (with half lives of 2 years to 10,000 years)

(2) Medium half-life isotopes (with half lives of thirty days to two years)

(3) Short half-life isotopes (with half lives of a few hours to thirty days)

The long-lived isotopes of the first class are of great value in this invention because the radioactive paramagnetic particles prepared from them lose radioactivity only at a very slow rate. The medium life of the second class may limit their usefulness. However, the class contains certain isotopes with desirable properties not found in the nuclides of the other two classes. For example, the cerium 144 preparation as explained contains the extremely powerful praseodymium 144 and can be detected at long range. Also silver 110 m. with a 270 day half-life may be converted easily from its ionic form to metallic silver by reduction. The silver so fixed cannot be replaced by extraneous ions unless the silver is first oxidized back to the ionic state.

The short half-life isotopes have the disadvantage of deteriorating rapidly, but because they do lose their radioactivity in a matter of a few weeks or a few months they enable test bodies carrying paramagnetic particles containing these isotopes to revert back to an essentially non-radioactive condition by simple standing. For example, magnetic particles containing gold 198 of half-life 2.7 days or yttrium 90 of half-life 2.54 days would retain only one-half of their original activity after 2.7 days, one sixteenth of their activity after 11 days and one 250th of their activity after 22 days. Retention of the test bodies carrying such particles for 44 days after testing would substantially reduce the radioactivity by natural decay to sixteen one-millionths of the original activity.

A radioisotope is chosen not only according to whether or not it has a suitable half-life for the specific purpose, but also for the type of radioactive emission it has. For the most part the choice is between beta and gamma rays and between high energy and low energy emissions.

If gamma ray counting mechanisms are to be used, any isotope that gives off substantial quantities of gamma rays of energy above, say 0.1 million electron volts (0.1 m.e.v.), may be practical if the other properties of valence, half-life and cost are suitable. The greater the number of nuclear changes per second which result in gamma rays the easier the detection of the treated magnetic particles will be, assuming gamma detection only. The chief advantage of using an isotope with energetic as opposed to weak gamma rays is that the counting instrument indicates more clearly the existence of the treated particles in the presence of the extraneous radiation making up the room background.

The chief counting instruments for gamma rays are the scintillation counters. When these are used either singly or in pairs for coincidence counting, measurement of the gamma emitting isotopes is a simple matter.

When it is desired to reduce the amount of background radiation to extremely low levels, a well-type counter is used which not only screens out most of the extraneous radiation from the room by the use of a lead shield, but registers a much higher percentage of the emitted rays from the test body. In a well counter the scintillation crystals can completely surround the body in a cylindrical manner while the photomultiplier tubes cemented directly to the crystal surfaces pick up a high percentage of the photons created in the crystals by the gamma rays from the test body.

Some radionuclides emit beta rays (electrons) only; some emit gamma rays only. However, most radionuclides together with their degradation products emit both beta and gamma rays. Therefore, either the beta rays or the gamma rays can be sensed or counted in these cases. It is somewhat less expensive to base a detection system on beta ray counting since the Geiger-Muller counter or a modification of it can be used rather than the more expensive scintillation counter. For example, cesium 137, cobalt 60, cerium 144 and silver 110 m. which emit both types of rays are easily and conveniently detected and evaluated with a Geiger-Muller (GM) counter.

The same counter is used, of course, for the isotopes which emit beta rays only. Thus thallium 204, promethium 147, strontium 90, yttrium 90, bismuth 210 and sulfur 35 are pure beta emitters. The use of a pure beta emitter has several advantages. First, the ratio of the isotope count to the room background can be made very high. Second, flaws on one side of a metal object can be detected separately from flaws on the other side of the object since the beta electrons do not pass through the object from the reverse side. Third, the detection operation can be observed by personnel from behind transparent plastic shields without danger from the beta radiations of the test body.

The following are examples, by way of illustration and not as limitations, of specific radioactive paramagnetic powders prepared according to this invention and methods of using them:

*Example 1*

1362 parts of paramagnetic iron oxide powder are mixed thoroughly with 445 parts of an A stage epoxy resin made by reacting substantially one mol proportion of the diphenol of the formula:

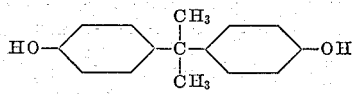

with two mol proportions of epichlorhydrin. This and subsequent mixing operations are carried out conveniently in a water-jacketed horizontal kneading unit. 350 parts of pulverized sulfonated styrene type cation exchange resin in its sodium form are added and mixed for 40 minutes. 66.5 grams of melted meta phenylene diamine are added and the mixing continued until the viscosity drops markedly and mass is uniform. The material is removed from the mixer, cut into pieces about one cubic inch in size and allowed to stand at 25 to 35° C. for 16 to 18 hours. The lumps of aggregate are broken up finely enough to pass a 4 mesh screen. The resulting granular material is ground in a pebble mill with 1.05 times its weight of distilled water for 8 hours. The resulting slurry is allowed to settle and some particles of free ion exchange resin are levigated off. The solid is filtered off, dried at 105° C., then cured for one-half hour at 150° C. The cured material is broken up again to form a loose powder.

*Example 2*

One gram of the product of Example 1 in 40 ml. of water is treated with one millicurie of the chloride of scandium 46 in 10 ml. of water, and the whole stirred for a few minutes. The aggregate is filtered off and washed with 40 ml. of water. The cake of aggregate contains almost 100% of the original scandium 46. Additional washing does not remove any appreciable amount of scandium from the cake. The wet filter cake is dispersed in 750 ml. of water containing a nonfoaming wetting agent. The resulting slurry of radioactive paramagnetic particles has a useful life of from three to six months depending upon the sensitivity of the detecting instruments used.

*Example 3*

One gram of the product of Example 1 in 20 ml. of water is treated with 0.8 millicurie of the chloride of promethium 147 in 10 ml. of water. The mixture is diluted with 470 ml. of water containing a wetting agent and a defoaming agent. As in Example 2 the radioactive ions are taken up virtually completely. The radioactive paramagnetic particles of the suspension give off only beta rays having an average of 220,000 electron volts (0.22 m.e.v.) with no attendant gamma rays. Half of the original intensity is lost in 2.6 years.

*Example 4*

One gram of the product of Example 1 in 20 ml. of water is treated with 0.2 millicurie of a soluble salt of cerium 144 in 30 ml. of water. After stirring a few minutes, the radioactive magnetic particles may be freed of salt by filtering off and washing with distilled water or used directly after by diluting with a suitable aqueous suspending medium. The particles give off extremely potent beta rays of 2.97 million electron volts. In addition the daughter isotope praseodymium 144 gives off 0.134 and 2.18 m.e.v. gamma rays. This composition is useful in those cases in which the sensing instrument must be located at a distance of a foot or more from the object to be examined.

*Example 5*

40 milligrams of metallic cobalt are subjected to a neutron stream from an atomic reactor until for example 0.001% to 0.005% of the cobalt is converted from cobalt 59 to cobalt 60. The cobalt metal so treated is dissolved in a suitable acid such as nitric acid. The resulting solution is diluted to 50 ml. and mixed with a suspension of 5 grams of the product of Example 1 in 50 ml. of water. After a few minutes the aggregate particles are filtered off, washed with water and dried. With due precautions to avoid loss, 5 grams of the dry material so formed is dispersed in twice its weight of mineral oil to form a thin paste. The paste is further dispersed in 2500 ml. of kerosene. The result is a suspension in kerosene of radioactive paramagnetic particles suitable for use with test pieces which might rust if tested with aqueous test suspensions.

*Example 6*

125 grams of the product of Example 1 are mixed with 50 grams of a siliceous filter aid and wet down with enough distilled water to form a free-flowing slurry. A conventional vertical ion exchange column having a filter disk at the bottom is filled three-quarters full with the slurry. The acid solution of cobalt nitrate of Example 5 is then introduced into the top of the column at the rate of 10 ml. per minute. The flow of liquid from the bottom of the column is adjusted to the same rate. After the solution has all been added, distilled water is run down through the column until the effluent is substantially free from radioactivity. The contents of the column are removed in the wet state and the radioactive paramagnetic particles separated from the filter aid by any suitable means such as levigation or selective wetting of the radioactive particles by a water-insoluble organic liquid of relatively low viscosity such as Stoddard solvent.

*Example 7*

1 millicurie of cesium 137 chloride with a half-life of approximately 30 years containing small amounts of barium 137 chloride, the daughter radionuclide, with a half-life of 2.6 minutes, is treated with 10 ml. of water until complete solution results. One-half gram of the product of Example 1 in 20 ml. of water is mixed with the cesium chloride solution, the whole stirred for several hours and the solid particles filtered off. After washing the cake with water, the cake and the filtrate are examined in similar volumes of water to determine the relative activity. 40% of the activity is found to be retained by the solid material so that the latter has a specific activity of 0.8 millicurie per gram. A suitable dispersing agent may be used if desired in the suspending liquid.

*Example 8*

1362 parts of paramagnetic red iron oxide powder are mixed thoroughly with 423 parts of a substantially monomeric epoxy resin intermediate having the formula:

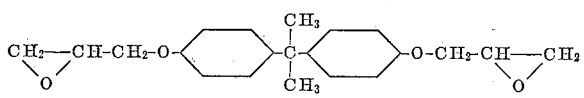

175 parts of pulverized sulfonated styrene type cation exchange resins are added. 175 parts of the fluorescent azine of 2 hydroxy 1 naphthaldehyde of the formula:

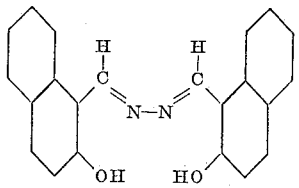

are also added. The above ingredients are kneaded until thoroughly mixed. 63.4 parts of melted meta phenylene diamine are added and the mixing continued. The mass is allowed to stand overnight at 25 to 40° C. The material is then ground in a pebble mill with water for 8 to 10 hours. The slurry is filtered and the cake is mixed with water to produce a paste or slurry of 50% solids content. The paramagnetic aggregate particles of the slurry are highly fluorescent. They glow with a distinctive greenish yellow color under ultraviolet light. Instead of the above specific fluorescent azine, numerous other satisfactory fluorescent materials may be employed, such as, for example, the azine of 2 aceto 1 naphthol, fluorescent zinc oxide, fluorescent or phosphorescent zinc sulfides, Lumogen L Red Orange and various resinous type fluorescent pigments such as those described in Switzer et al., U.S. Patent No. 2,498,592. Further, it is not necessary that the fluorescent agent, if a dye rather than a pigment, be combined with the paramagnetic element by mixing the agent in the resin joining the carrier component to the paramagnetic element. Instead, as one energy-releasing indicating medium which may be used together with radioactive material as another energy-releasing indicating medium, a fluorescent dye ionized in a solution may be bonded to the testing particles by immersion of the powders therein. Such solution may be the same solution in which the radioactive material is dissolved so that both are bonded to the testing particles simultaneously or the radioactive material and the fluorescent dye may be attached by successive immersion in separate solutions.

*Example 9*

One gram of the 50% paste of Example 8 is added to 15 ml. of water. 0.4 millicurie of thallium 204 nitrate in 15 ml. of water was mixed in. After one hour the solid is filtered off and dried if desired. The solid retains approximately 45% of the radioactive ions. The solid is suspended in any suitable liquid such as water, organic solvents or petroleum derivatives stable to radiation. The particles containing thallium 204 give off powerful beta radiation of 0.765 m.e.v. No gamma rays are emitted. This radioactive product may be used to advantage in large amounts in those cases in which it is desired that personnel remain in close proximity to a flaw detection system in which large test pieces are dipped or sprayed with the slurry provided only that plastic or glass shields, for example, are interposed between the system and the personnel, since the beta rays cannot pass through such shields. The half-life of the thallium product is 4 years. After automatic sorting of the parts by radiation detecting counters, parts rejected for high activity may be inspected further by personnel using ultraviolet light since any indications on the test pieces are fluorescent as well as radioactive.

*Example 10*

An adsorptive aggregate is made up as in Example 1 except that 350 parts of pulverized activated bauxite are used in place of the pulverized cation exchange resin.

*Example 11*

0.5 millicurie of sulfur 35 in the form of sulfuric acid is taken up in 10 ml. of water and mixed with one gram of the product of Example 10. The resulting radioactive paramagnetic particles are filtered off, washed with water and dried. They are suspended in a gas oil having a boiling range just above that of kerosene. The radioactive component has a half life of 87 days. The beta rays given off have an average energy of 0.167 m.e.v.

*Example 12*

An adsorptive aggregate is made up as in Example 1 except that 1362 parts of bright iron filings passing a 150 mesh screen are used in place of the iron oxide powder.

*Example 13*

The product of Example 12 is treated with a solution of cesium 137 chloride to produce a paramagnetic radioactive aggregate.

*Example 14*

1300 parts of paramagnetic red iron oxide powder are mixed with 400 parts of a substantially monomeric epoxy resin intermediate containing two epoxide rings per molecule. 350 parts of air-dried anion exchanging resin of the quaternary ammonium-styrene type in its chloride form are added. The ingredients are kneaded together at room temperature. 60 parts of melted meta tolylene diamine are added and the mixing continued until the mass is uniform. The mass is allowed to stand at 25 to 35° C. overnight, then broken up into particles of a size suitable for pebble milling. The material is ground in a pebble mill with an equal weight of deionized water for 6 hours. The resulting slurry is filtered off and air dried at room temperature. The dry filter cake is age-cured by holding it at 40–45° C. for three weeks. The cake is then broken up to form a loose powder; for example, by grinding for 20 minutes in a pebble mill with an equal weight of water. This material is manufactured at temperatures near room temperature because the quaternary ion exchange resin breaks down if subjected to temperatures above about 45° C. The resulting material may be stored in the form of the 50 percent slurry produced by milling.

*Example 15*

0.5 millicurie of a solution of sulfuric acid derived from radioactive sulfur 35 is brought to a volume of 20 ml. and mixed with two grams of the final 50 percent slurry of Example 14. The radioactive sulfate radicals are taken up to the extent of practically 100 percent by the quaternary ion exchange centers of the aggregate particles. The hydrochloric acid formed and any sulfuric acid not taken up are removed by filtering off the solid and washing with water. The resulting product is dispersed in a suitable suspending medium.

*Example 16*

1 millicurie of tantalum 182 in the form of potassium tantalate in 20 ml. of water was treated with one gram of the final 50 percent slurry of Example 14. The radioactive ion is taken up by the particles to the extent of more than 80 percent. The radioactive half life of the product is 115 days.

*Example 17*

One gram of the product of Example 8 is dispersed in 40 ml. of water. 0.5 millicurie of freshly prepared gold 198 chloride, $AuCl_3$, in acid solution is diluted up to 20 ml. and mixed in. The radioactive ions are completely absorbed by the particles of fluorescent aggregate. The slurry may be diluted directly with water containing a wetting agent and a defoaming agent. The half life of the gold 198 is 2.7 days.

*Example 18*

One gram of the product of Example 8 is dispersed in 30 ml. of water. 0.5 millicurie of radium chloride in 15 ml. of water is mixed in. The solid is filtered off, washed with distilled water and made up to form a working suspension with additional water and a wetting agent. Alpha, beta, and gamma rays are emitted by the radium and its daughter radionuclides.

*Example 19*

An adsorptive ion exchange aggregate is made up as in Example 8 except that in place of the sulfonated styrene type resin an equal weight of a phenol-sulfonic acid-formaldehyde type ion exchange resin is employed.

*Example 20*

One gram of the product of Example 19 in 30 ml. of water is treated with one millicurie of cesium 137 chloride in 10 ml. of water. The solid is filtered off and washed with water. The cake is dispersed in a liquid capable of wetting both the particles and metal test objects.

*Example 21*

1360 parts of paramagnetic iron oxide powder are mixed thoroughly with 455 parts of 3,4 epoxy 6 methyl cyclohexylmethyl 3,4 epoxy 6 methylcyclohexane carboxylate. 350 parts of a pulverized carboxylic type ion exchange resin made by co-polymerizing acrylic acid and divinyl benzene is mixed in. 108 parts of diglycolic acid are added and the whole mixed in a kneading unit for 1 hour until the mass starts to harden. The mass is broken up, spread on a tray, and allowed to stand overnight. The product is cut or ground into small pieces, then ground with 1.1 times its weight of deionized water for 20 hours. The solid material is filtered off and dried at 80° C. The powder is cured for one-half hour at 145° C. The cured material is ground for a short time with 1.2 times its weight of water and filtered off on a large Buchner funnel. The cake is redispersed in 7 liters of water and converted from the carboxy form to the sodium carboxylate form by stirring the suspension and adding very slowly 1.4 liters of 2.5 normal sodium hydroxide solution. The whole is allowed to stand 24 hours, then filtered and washed with 14 liters of deionized water. The resulting cake is made up to a solids content of 50% by adding water.

*Example 22*

2 grams of the 50% cake of Example 21 are mixed with 400 ml. of water and treated with 0.4 millicurie of an aqueous solution of a salt of cobalt 60. The ion exchange reaction causes substantially 100% of the cobalt 60 ions to replace sodium attached to the carboxylate groups of the ion exchange resin. Although the carboxylate groups hold the cobalt ions very strongly the particles may be freed of radioactive cobalt by washing with dilute mineral acids. This capability of ion exchange components to be stripped of the attached metal ions by acid or in many cases by salts such as sodium chloride can be utilized in various decontamination procedures.

*Example 23*

The product of Example 21 is treated with a mixture of the chlorides of europium 152 and europium 154, the first of which has a half life of 13 years, the second of 16 years, to give a suspension of paramagnetic radioactive particles having a specific activity in millicuries per gram of aggregate between 0.1 and 2.0.

*Example 24*

Resinous material of the styrene-divinyl benzene type carrying substituting groups having the structure:

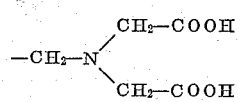

is ground to a powder. 350 parts of this powder are kneaded with 1362 parts of paramagnetic iron oxide and 423 parts of a glycidyl type epoxy resin intermediate containing two epoxide rings per molecule. 63.4 parts of melted meta phenylene diamine are added and the mixing continued until the mass is uniform. The mass is allowed to convert to the B stage at room temperature. It is broken up and pebble-milled with 1.05 times its weight of distilled water for 8 hours. The resulting material is allowed to settle and the paramagnetic particles separated and dried. The dry material is kept at 40° C. for three weeks. The cured material is ground for a short time with 1.1 times its weight of water and filtered. The cake is redispersed in water and treated with a quantity of sodium hydroxide corresponding to one molecule of NaOH for each carboxyl group present in the cured material. The product is thus partially converted to its sodium salt form. The solid is filtered off and washed with distilled water. The cake is made up to a solids content of 50%.

*Example 25*

2 grams of the 50% slurry of Example 24 are stirred into 40 ml. of water. 0.5 millicurie of cobalt 60 nitrate exhibiting a specific activity of 10,000 millicuries per gram of cobalt is diluted with a few ml. of water and added to the dilute slurry. The cobalt ions are very strongly sequestered and held by the ionized di (carboxymethyl) amine groups of the aggregate.

*Example 26*

2 grams of the 50% slurry of Example 24 are mixed with 40 ml. of water. 0.5 millicurie of cerium 144 chloride in 20 ml. of water is added with stirring. The solid is filtered off, dried, milled into twice its weight of petrolatum and diluted with a relatively nonvolatile liquid hydrocarbon or halogenated hydrocarbon.

*Example 27*

Two clean three inch steel turbine blades, one known to have almost invisible cracks in its surface, the other free of cracks, are magnetized between the poles of a powerful magnet. Both blades are dipped in the slurry of Example 2 then examined with a Geiger Muller counter. With a room background radiation count of 120 counts per minute, the uncracked three inch blade shows a total count of 275 counts per minute three inches from the counter while the cracked blade shows a total count of 425 counts per minute at the same distance. Accordingly, the counts adjusted for background count to 155 and 305, respectively, show an increase of some 100% attributable to radioactive particles deposited on the flaws in the cracked blade. The blades are cleansed of all radioactive particles, preferably by vibration in contact with a suitable liquid in an ultrasonic cleaning unit.

*Example 28*

A 0.4% carbon steel bar is heated to red heat, quenched in a spray or bath of water, then reheated to a dull red heat and requenched so that quenching cracks form in the surface of the bar. The surface is cleaned to remove scale. The bar is clamped between two electrodes of a magnetizing unit and a current of 1000 amperes passed through the bar for one-third of a second. The bar is removed and the slurry of Example 7 in a uniform condition of agitation is flowed over the bar. The radioactive paramagnetic particles adhere to the bar predominantly in those areas which have quenching cracks. An unquenched bar is similarly magnetized and treated with the slurry. Both pieces are examined with a Geiger Muller counter for radioactivity. It is found that the unquenched bar shows a relative count of 800, not including the room background of 700 counts per minute, while the quenched bar shows a count depending on the number and size of the cracks of from 1000 to 1150 counts per minute, not including the room background. The relatively high radioactivity of the unquenched bar may be reduced very largely by a water dip as in Example 29. Similar readily evident differences in the radioactivity of flawed and unflawed test bodies will be observed by repeating the tests of Examples 27 and 28 with the radioactive magnetic powders of Examples 2 to 26. For production testing of numerous duplicate parts using known flawed and unflawed parts as controls and taking into account possible deterioration of radioactive materials of short half-life, background radiation, et cetera, count ranges for acceptable, questionable, and rejectable parts may be established.

*Example 29*

A plain unquenched magnetized steel bar and a strongly quenched and magnetized steel bar, the bars similar to those used in Example 28, are dipped in the stirred suspension of Example 3. Each piece is then rinsed to remove loose adhering particles by dipping in water with mild agitation. With a room background of 300 counts per minute the plain piece shows a total count of 400 counts per minute, the quenched piece with cracks shows a total count of 650 counts per minute, an increase of 250% if the background is substracted.

*Example 30*

A plain unquenched magnetized steel bar and a strongly quenched and magnetized steel bar which has large cracks on a side designated as the front and which has a few small cracks on the other side designated as the back are dipped in the stirred suspension of Example 4. Each bar is then rinsed to remove loosely adhering particles. The plain piece shows a count of 1300 including a room background of 950 counts per minute. The back of the quenched piece shows a count of 1450 or 150 more than the plain piece. The front of the quenched piece shows a count of 1800 or 500 more than the plain piece under the same conditions. Thus with the suspension of Example 4, it is possible not only to detect the presence of flaws in the steel bar, but also to distinguish between the side of the bar that has large cracks from the side of the bar which has small cracks.

*Example 31*

A 0.4% carbon steel bar 12 inches long is heated to red heat for a distance of three inches at one end and quenched with water. The bar is reheated over the same three inch length to red heat and quenched a second time so that cracks develop at the quenched end. The bar is cleaned to remove loose scale. The bar is dried, magnetized by the use of a surrounding coil and flooded with the kerosene suspension of cobalt 60 impregnated particles of Example 5. The bar is rinsed with plain kerosene. The bar is scanned with a Geiger Muller counter from one end to the other holding the counter at a distance of one inch from the bar. The cracked end of the bar shows a disintegration count significantly higher than the uncracked end. Instead of scanning the bar by relative movement of the sensing instrument and the bar, the bar or other object may be brought into position with respect to a number of sensing elements which are stationary with respect to each other, and the number of counts per minute produced by each sensing element compared in order to locate the position of flaws on the test object.

*Example 32*

A 0.4% carbon steel bar is heated and quenched so as to produce definite cracks in the surface. The bar is magnetized and dipped in a suspension containing the product of Example 7 then rinsed with water. The bar shows a Geiger Muller count of 900 counts per minute not including the room background. The bar is then dipped in 10% solution of sodium chloride for one minute and mildly agitated. The sodium ions of the solution replace the cesium ions attached to the sulfonate groups of the ion exchange resin. The bar removed from the salt solution shows a count of 200 counts per minute not including room background. A second one minute dip in fresh 10% salt solution reduces the radioactivity of the bar to 50 counts per minute not including background. Thus, the two dips brought about a reduction of the radioactivity of the bar of 93%.

*Example 33*

Employing radioactive fluorescent magnetic particles made according to Example 9, large production quantities of repetitive parts are magnetized, subjected to a flush with a dispersion of fluorescent, radioactive paramagnetic powders, suitably drained and rinsed, and then conveyed by automatic conveyor past suitable counters. Unflawed parts pass the counters, without activating any signal or sorting device, to a suitable receiving bin for such subsequent decontaminating as may be desired. Should the count of any additional piece exceed the established "safe" limit, a signal actuated by the counter may stop the conveyor or actuate a sorting device. Either by examination under filtered ultraviolet light at that moment or later, the operator, shielded to whatever degree is required, may ascertain from the visible indication of the fluorescent powdered material the extent and location of the flaws in the piece being tested. If the article is to be removed from the line or directed to a separate line for closer inspection the particles may be fixed by means of a clear lacquer spray to avoid dusting off. Visual inspection can minimize "over-inspection" that is, the rejection of acceptable parts due to false or irrelevant flaw indications. Such false or irrelevant indications can be caused in a number of ways. For example, often the contour and intended use of the part is such that a flaw may be in a sufficiently uncritical or relatively unstressed portion of the part to permit it to be accepted, whereas a flaw of the same extent in a critical area would be a cause for rejection. Also, individual pieces may give false indications by accumulating and holding excess quantities of the radioactive powder for reasons other than the presence of flaws, i.e., because of grease or cutting oils not properly cleaned, or unremoved flash (in the case of forgings), excessive surface roughness (in the case of castings) etc. The visual supplemental inspection afforded by fluorescent radioactive test powders can usually enable the operator to distinguish readily between true and false flaw indications. In any event, due to automatic preselection before visual inspection, the operator is relieved of the chore of visually inspecting numerous acceptable pieces, the number of operators required is greatly reduced, and the chance for human error is greatly minimized by eliminating the boring task of careful visual inspection of acceptable items in addition to the rejectable and questionable ones in a given production lot.

This invention may be modified and varied from the several examples disclosed above without departing from the spirit and scope of this invention as set forth in the following claims. Indeed, it is expected that those skilled in the art will find suggestions for specific manufacturing techniques, ingredients for the powders and suspension thereof, and methods and equipment for using the same as a consequence of the foregoing disclosure and the exigencies of particular items to be inspected.

It is to be understood that the terms "bonds," "bonded," and "bonding," as used in the preceding specification and the following claims include and relate to, unless otherwise specified, not only chemical bonds resulting from chemical reaction but also surface-active physical bonds resulting from adsorption or absorption.

What is claimed is:

1. The method of testing magnetizable test bodies for flaws comprising the steps of creating a magnetic flux within a first control comprising a magnetizable test body known to contain no magnetically revealed flaws, flushing said first control with a dispersion of paramagnetic radioactive powder, and measuring the radioactivity of said first control after said powder has been substantially removed from the unflawed surfaces of said first control to establish a range of permissible radiation from said first control, repeating said steps with respect to a second control comprising a substantial duplicate test body but known to be sufficiently flawed to render said article unsuitable for service in order to establish a probable minimum range of radiation which, if exceeded, would indicate that the article is unsuitable for service, and repeating said steps with respect to substantially duplicate test bodies of unknown flawed condition to ascertain whether sufficient radioactive magnetic powder has been retained on the surface of said test bodies in the area of flaws to indicate the probable unserviceability of said test bodies.

2. The method of claim 1 including the further step of disactivating any radioactive powder which may remain on said test bodies by removal of the radioactive component.

3. The method of claim 1, in which said powder contains a fluorescent agent of the class consisting of fluorescent dyes and pigments, and including the further step of then inspecting test bodies of questionable serviceability under fluorescigenous radiation to ascertain visually the extent and location of flaws which may exist, the existence of such flaws being indicated by the emission of visible light by said fluorescent powders.

4. The method of testing magnetizable test bodies for flaws comprising the steps of subjecting specimen test bodies to a magnetic flux method of non-destructive testing in which the existence of flaws is revealed by visually discernible paramagnetic powder until a control having no magnetically located flaws in excess of a permissible maximum is obtained, dispersing a paramagnetic radioactive powder over said control and subsequently removing such powder from the surface of said control to substantially the same extent that said powder, other than that retained by a magnetic flux, is to be removed in testing specimens of unknown flawed condition, measuring said control with apparatus responsive to radioactive emission to establish a range of permissible radioactivity of said control, thereafter testing bodies of unknown flawed condition but which otherwise substantially duplicate said control by passing a magnetic flux through each of said test bodies, dispersing over said test bodies a radioactive paramagnetic powder substantially the same as that employed with said control, therefter removing from said test body substantially all of such powder other than that which may be retained in the location of flaws by magnetic flux, measuring the radioactive emission of each of said test bodies, and separating the test bodies whose emission exceeds the permissible range established by said control from those whose measured emission falls within said range.

5. The method of testing magnetizable test bodies for flaws comprising the steps of subjecting specimen test bodies to a magnetic flux method of non-destructive testing in which the existence of flaws is revealed by visually discernible paramagnetic powder retained on the surface of the test body in the vicinity of flaws to obtain a control having the permissible maximum of flaws as revealed by such retained powder, dispersing a paramagnetic radioactive powder over the surface of said control and subsequently removing such powder from the surface of said control to substantially the same extent that said powder, other than that retained by a magnetic flux, is to be removed in testing specimens of unknown flawed condition, measuring the radioactive emission of said control, and thereafter testing bodies of unknown flawed condition but which otherwise substantially duplicate said control by passing a magnetic flux through each of said test bodies, dispersing over said test bodies a paramagnetic radioactive powder substantially the same as that employed with said control, thereafter removing from said test bodies substantially all of such powder other than that which may be retained by magnetic flux in the location of flaws, measuring the radioactive emission by each of said test bodies, and separating the test bodies whose measured emission exceeds the emission of said control from those whose measured emissions are no more than equal to the emission of said control.

6. In the method of testing magnetizable test bodies for flaws, the steps of obtaining a previously prepared powder essentially consisting of particles comprised of paramagnetic subparticles and a resin adhered thereto, activating said powder by intimately mixing it in a dispersion of tracer elements of the class consisting of radioactive and fluorescent compounds capable of bonding with said resin, thereafter passing a magnetic flux through magnetizable test bodies, dispersing said activated powder over said test bodies, and scanning said test bodies to ascertain the existence of flaws therein through emissions from said powders retained in the location of flaws by the action of the magnetic flux passed through said body.

7. The method as defined in claim 6 including the further steps of treating spent paramagnetic powders to disactivate bonds between the tracer element and the resin components of said powders, and substantially separating said tracer elements from the remainder of the powder to permit separate disposals thereof.

8. The method as defined in claim 6 including the further step after testing of cleansing tested bodies of residual radioactive paramagnetic particles and sub-particles created by mechanical fracturing of the powder used thereon.

9. The method as defined in claim 8 in which the step of cleansing includes the step of disactivating the bonds between radioactive tracer elements and the resin of residual powder particles and sub-particles.

References Cited by the Examiner
UNITED STATES PATENTS

| | | | |
|---|---|---|---|
| 2,267,999 | 12/1941 | Switzer | 250—71 X |
| 2,878,392 | 3/1959 | Polito | 250—71 |
| 2,916,623 | 12/1959 | Ritchey | 250—65 |
| 3,005,912 | 10/1961 | Babcock | 250—65 |

RALPH G. NILSON, *Primary Examiner.*

ARCHIE BORCHELT, *Examiner.*